United States Patent
Lee et al.

(10) Patent No.: US 9,334,741 B2
(45) Date of Patent: May 10, 2016

(54) DISCREETLY DEFINED POROUS WALL STRUCTURE FOR TRANSPIRATIONAL COOLING

(75) Inventors: Ching-Pang Lee, Cincinnati, OH (US);
Chander Prakash, Oviedo, FL (US);
Gary B. Merrill, Orlando, FL (US);
Andreas Heselhaus, Duesseldorf (DE);
Andrew J. Burns, Longwood, FL (US)

(73) Assignees: Siemens Energy, Inc., Orlando, FL (US); Mikro Systems, Inc., Charlottesville, VA (US)

( * ) Notice: Subject to any disclaimer, the term of this patent is extended or adjusted under 35 U.S.C. 154(b) by 1426 days.

(21) Appl. No.: 12/765,004

(22) Filed: Apr. 22, 2010

(65) Prior Publication Data
US 2011/0262695 A1    Oct. 27, 2011

(51) Int. Cl.
*B32B 3/10* (2006.01)
*B32B 3/12* (2006.01)
*F01D 5/18* (2006.01)

(52) U.S. Cl.
CPC ............. *F01D 5/182* (2013.01); *F01D 5/183* (2013.01); *F01D 5/184* (2013.01); *F05D 2230/22* (2013.01); *F05D 2230/90* (2013.01); *F05D 2250/18* (2013.01); *F05D 2250/185* (2013.01); *F05D 2250/28* (2013.01); *F05D 2250/30* (2013.01); *F05D 2260/203* (2013.01); *F05D 2260/221* (2013.01); *Y10T 428/24273* (2015.01)

(58) Field of Classification Search
USPC ............. 428/116, 131, 135, 136, 304.4, 596, 428/613; 416/97 A, 229 A, 229 R, 231 R; 60/754; 29/889.721; 165/907; 415/115, 415/116
See application file for complete search history.

(56) References Cited

U.S. PATENT DOCUMENTS

| | | | |
|---|---|---|---|
| 3,554,663 A | 1/1971 | Helms | |
| 3,606,572 A * | 9/1971 | Schwedland | 416/90 R |
| 3,606,573 A * | 9/1971 | Emmerson et al. | 416/90 R |
| 3,616,125 A * | 10/1971 | Bowling | 416/229 A |
| 3,656,863 A | 4/1972 | De Feo | |
| 3,825,364 A * | 7/1974 | Halila et al. | 415/116 |
| 4,022,542 A | 5/1977 | Barbeau | |
| 4,168,348 A * | 9/1979 | Bhangu et al. | 428/573 |
| 4,269,032 A * | 5/1981 | Meginnis et al. | 60/754 |
| 4,292,376 A * | 9/1981 | Hustler | 428/593 |
| 4,302,940 A * | 12/1981 | Meginnis | 60/754 |
| 4,312,186 A * | 1/1982 | Reider | 60/754 |

(Continued)

FOREIGN PATENT DOCUMENTS

| | | |
|---|---|---|
| EP | 1500880 A2 | 1/2005 |
| GB | 815596 | 7/1959 |

(Continued)

*Primary Examiner* — Maria Veronica Ewald
*Assistant Examiner* — Joanna Pleszczynska

(57) ABSTRACT

A wall structure (32, 42, 68, 70, 80) with layers (A, B, C, D, E) of non-random voids (26A, 26B, 28B, 30B) that interconnect to form discretely defined tortuous passages between an interior (21) and an exterior surface (23) of the wall for transpiration cooling of the wall. A coolant flow (38) through the wall may be metered by restrictions in coolant outlets (31) and/or within the passages to minimize the coolant requirement. Pockets (44) may be formed on the exterior surface of the wall for thermal Insulation (46). The layers may be formed by lamination, additive manufacturing, or casting. Layer geometries include alternating layers (A, B, C) with different overlapping void patterns (42), 3-D lattice structures (70), and offset waffle structures (80).

15 Claims, 3 Drawing Sheets

(56) References Cited

U.S. PATENT DOCUMENTS

| | | | |
|---|---|---|---|
| 4,629,397 A | 12/1986 | Schweitzer | |
| 5,370,499 A * | 12/1994 | Lee | 416/97 R |
| 5,931,638 A * | 8/1999 | Krause et al. | 416/97 R |
| 6,478,535 B1 | 11/2002 | Chung et al. | |
| 6,530,225 B1 * | 3/2003 | Hadder | 60/772 |
| 6,746,755 B2 | 6/2004 | Morrison et al. | |
| 6,761,956 B2 * | 7/2004 | Lee et al. | 428/131 |
| 6,984,102 B2 * | 1/2006 | Bunker et al. | 415/115 |
| 7,043,921 B2 | 5/2006 | Hadder | |
| 7,141,812 B2 | 11/2006 | Appleby et al. | |
| 7,153,096 B2 | 12/2006 | Thompson et al. | |
| 7,153,464 B2 | 12/2006 | Millard et al. | |
| 7,246,993 B2 | 7/2007 | Bolms et al. | |
| 2005/0118392 A1 | 6/2005 | Millard et al. | |
| 2008/0105402 A1 * | 5/2008 | Behrens et al. | 165/41 |

FOREIGN PATENT DOCUMENTS

| | | |
|---|---|---|
| GB | 1226751 | 3/1971 |
| GB | 2049152 A | 12/1980 |
| GB | 2192705 A | 1/1988 |

* cited by examiner

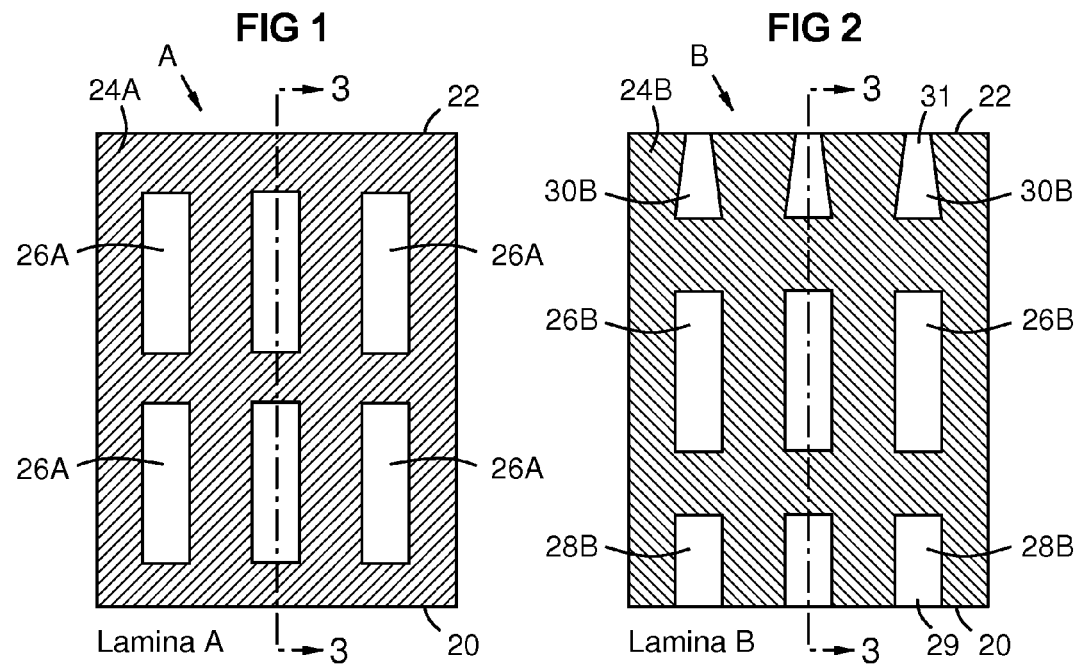
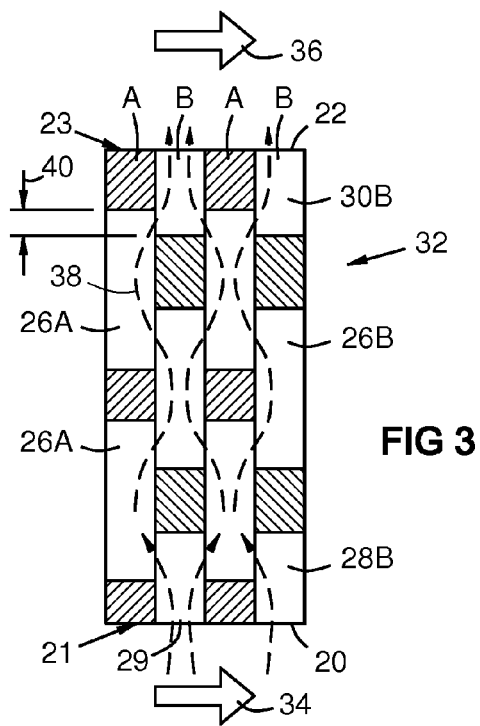

ced"" means individually engineered or determinate (hav-
DISCREETLY DEFINED POROUS WALL STRUCTURE FOR TRANSPIRATIONAL COOLING

FIELD OF THE INVENTION

This invention relates to through-wall fluid cooling of wall structures, and particularly to transpiration cooling of components in gas turbine engines.

BACKGROUND OF THE INVENTION

In a gas turbine engine, hot section components, such as combustor liners, transition ducts, turbine airfoils, and turbine rings, require cooling airflows which are typically drawn from the high-pressure compressor. This air bypasses the combustion chamber, reducing the efficiency of the machine. There is a long-standing need for cooling schemes that require the use of less cooling air for improved engine efficiency and emission control.

Impingement and convection cooling have been used on interior surfaces of component walls (backside cooling). Film cooling has been used on exterior surfaces exposed to the hot combustion gas to cool the boundary layer of hot gas flow. Exterior surfaces may have thermal barrier coatings (TBC) for thermal insulation. Component walls are typically solid except for film cooling passages through the walls. Component structural walls are mostly cooled through heat conduction through the wall, interior surface coolant impingement and convection, and exterior surface film cooling.

In transpiration cooling, a coolant such as air is forced through a porous wall. It provides convection cooling inside the wall and efficient film cooling via outlet pores on the hot exterior surface of the wall. Transpiration cooling of gas turbine component walls has been implemented in various ways that generally fall into two categories: 1) holes drilled through the wall or formed by casting or molding the wall around removable pins. 2) Fibrous or other randomly porous material, including partially sintered ceramic or metal, metal felt or foam, and ceramic felt or foam. Randomly porous materials are generally not be suitable for high temperature, high load-bearing structures because they have random anisotropies due to uneven distributions of voids and solids that can cause weak points and uneven cooling. In addition, random fibrous structures are not inherently geometrically rigid.

BRIEF DESCRIPTION OF THE DRAWINGS

The invention is explained in the following description in view of the drawings that show:

FIG. 1 is a sectional view of a first layer of a porous wall structure.

FIG. 2 is a sectional view of a second layer of the porous wall structure.

FIG. 3 is a sectional view of a porous wall structure formed of alternate layers of FIGS. 1 and 2. The view is taken along line 3-3 of FIGS. 1 and 2.

DETAILED DESCRIPTION OF THE INVENTION

Figure 4:
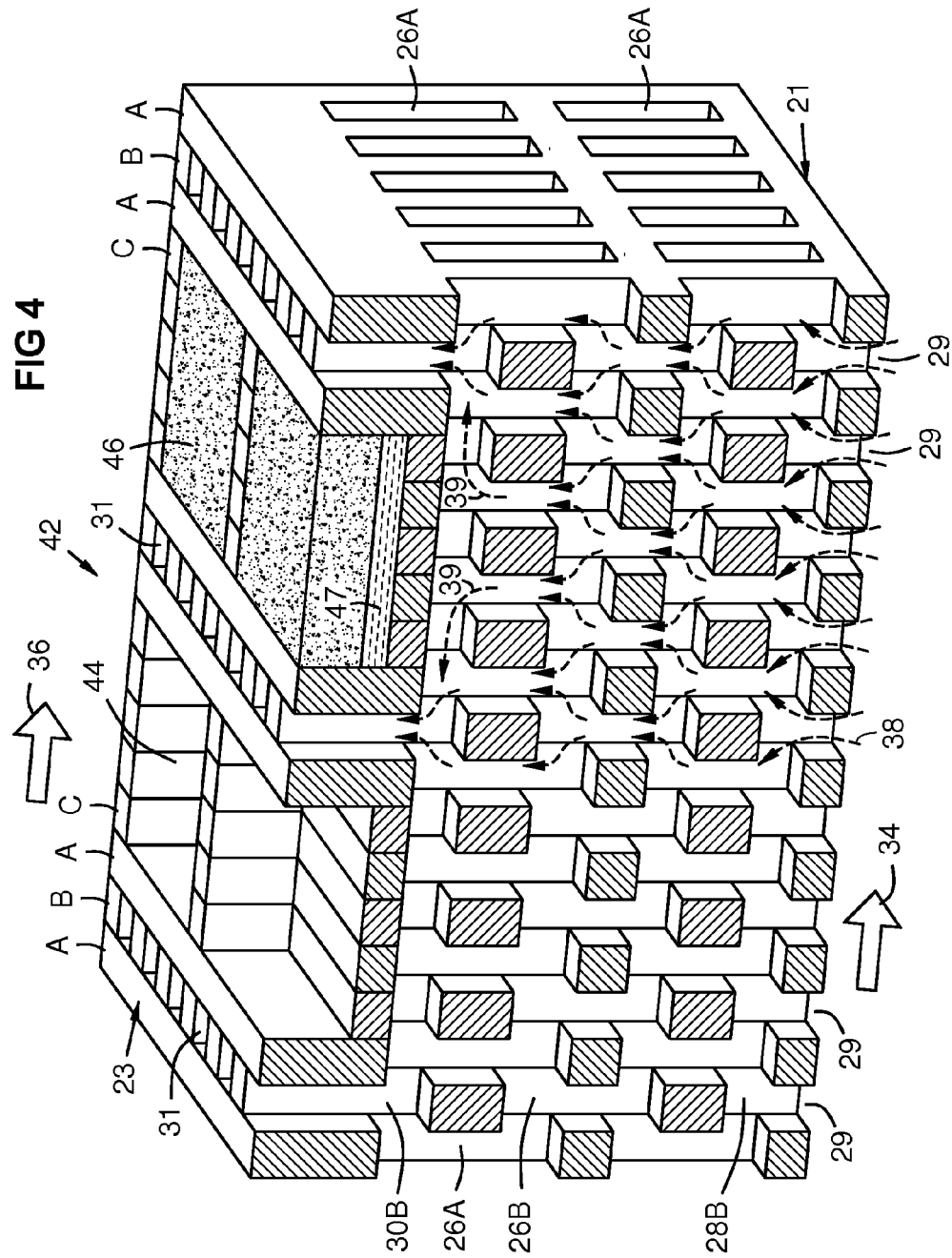
FIG. 4 is a perspective and sectional view of a 3-D porous wall structure according to aspects of the invention.

The invention provides a porous wall structure with discretely defined cooling passages. The term "discretely defined" means individually engineered or determinate (having known geometry and location), rather than random. The structure may have a layer geometry in which voids in adjacent layers partially overlap to form tortuous 3-D passages. Lamination layer-by-layer may be used for fabrication, or the structure may be cast as described herein or otherwise made in 3-D form, for example by direct metal laser sintering. Exemplary layer geometries are illustrated both individually and in integrated sequences.

FIG. 1 shows a first layer geometry A, with a first end 20, a second end 22, a solid portion 24A, and a first void pattern 26A. FIG. 2 shows a second layer geometry B with a first end 20, a second end 22, a solid portion 24B, a second void pattern 26B, a third void pattern 28B, and a fourth void pattern 30B. FIG. 3 shows a porous structure 32 formed by stacking layers A and B in an alternating sequence, and bonding them. The first ends 20 of the layers form an interior wall surface 21 that is subject to a coolant fluid 34. The second ends 22 form an exterior wall surface 23 that is subject to a hot gas flow 36. The coolant 34 is maintained at a higher pressure than the hot gas 36, and it follows serpentine paths 38 through the wall structure 32.

Some voids 28B are open to the interior wall surface 21, forming inlet holes 29. Other voids 30B are open to the exterior wall surface 23, forming outlet holes 31. Void shape may provide metering. For example, the void pattern 30B shows outlets 31 constricted by tapering as seen in FIG. 2. Metering may also be provided by limiting the degree of overlap 40 between voids of layers A and B.

FIG. 4 shows a 3-D porous wall structure 42 formed by sequences of three layer geometries A, B, and C. Layers A and B function as described for FIGS. 1-3. Layers C provide pockets 44 in the exterior surface 23 of the wall to contain thermal barrier material 46 on a bond coat 47. This embodiment provides transpiration and film cooling plus insulation between rows of coolant outlets 31. It has a self-compensating flow distribution 39, allowing flow around insulated portions 46. This characteristic also allows flow around any blockage, such as a large contaminant particle. Coolant from adjacent layers will flow laterally within the structure to fill a pressure deficit.

The layers herein may be non-parallel to a plane of the wall. Herein, "a plane of the wall" means the plane of the interior wall surface 21 or the plane of the exterior wall surface 23. In the case of curved walls, it means a plane tangent to the interior wall surface 21 or tangent to the exterior wall surface 23. The layers may or may not be normal to a plane of the wall, and they may or may not all have the same thickness.

Known processes may be used to create the structures herein. Various additive manufacturing technologies are known to create 3-D objects by successive layering of materials under computer control. They copy successive slices of a numeric solid model into the material. For example, direct metal laser sintering can directly produce complex 3-D forms in metals such as the superalloy Inconel 625 and others, and can directly form a production component. Selective laser sintering can produce 3-D forms in plastic, ceramic, or glass that can be used for tools, dies, molds, or cores to produce structures of the invention. 3-D printing may also be used to produce such elements in plastic or plaster.

Figure 5:
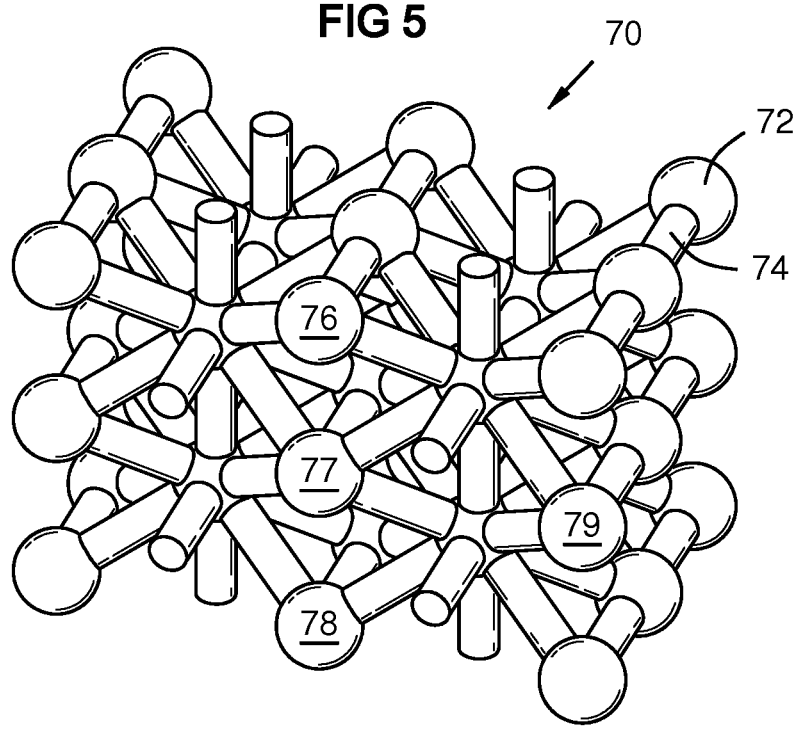
FIG. 5 is a perspective view of a lattice embodiment of the invention.

FIG. 5 shows a 3-D lattice embodiment 70 of the invention, composed of nodes 72 and links 74. It may have geometry like that of a crystal lattice model, and may have a scale of 0.1-5.0 mm spacing per unit cell in one embodiment (a node and its directly attached links). This forms a meta-material with characteristics determined by the lattice geometry, scale, and thicknesses of the nodes and links. Rigidity can be controlled in part by the lattice geometry. For example, in FIG. 5 rigidity and flow restriction can be increased by adding vertical links between nodes lacking them (exemplified by nodes 76, 77, 78) and/or by adding horizontal links between nodes lacking them (exemplified by nodes 77 and 79) and/or by adding additional nodes such as halfway between nodes 77 and 79. Such additional vertical links, horizontal links and additional nodes will impact rigidity and flow restriction in the respective directions to a different degree, thereby providing the designer with flexibility to customize a particular porous structure to a particular application. Herein, orientation terminology such as "vertical", "horizontal", and "lateral", is used for descriptive purposes relative to a drawing viewpoint. A layer of this embodiment may be defined as a plane of interconnected lattice unit cells. The scale, geometry, and complexity of this structure may be engineered such that the flow passages allow passage of particles at least up to a selected size, such as 10 microns in diameter, thus defining a minimum scale of the lattice by particle size.

Figure 6:
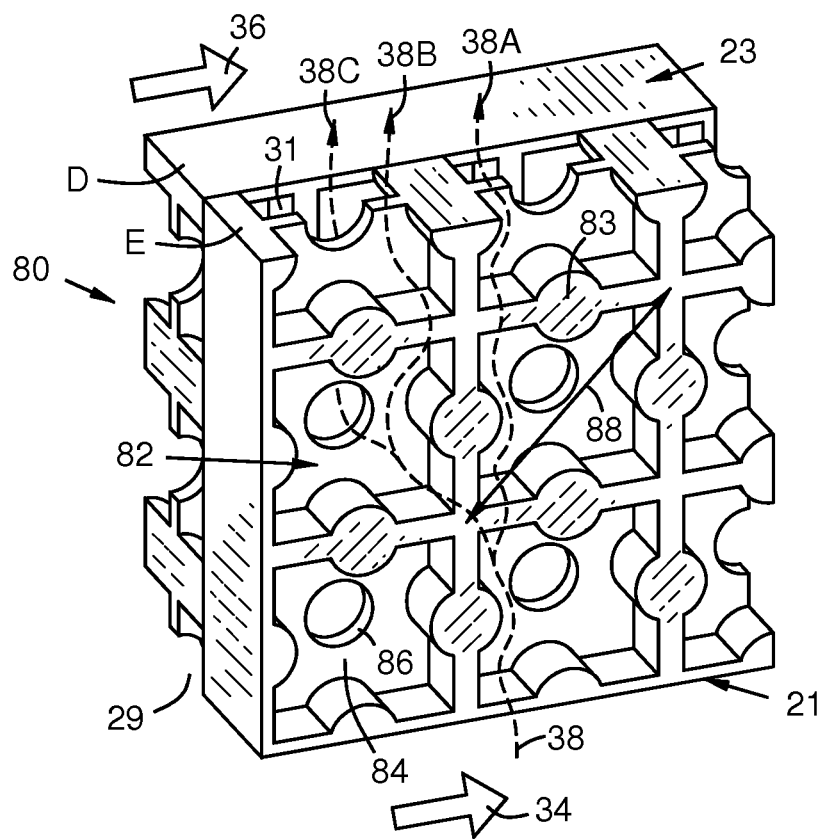
FIG. 6 is a perspective view of a waffle-layered embodiment of the invention.

FIG. 6 shows an embodiment 80 formed by layers of waffle structures D, E. Each layer D and E has opposed open-ended cells 82, especially rectangular cells. Square cells are shown. Each cell has a bottom wall 84, which may or may not have a pass-through hole 86. Two adjacent layers D and E may have the same geometry. They may be offset from each other vertically or diagonally by up to half a cell spacing. In FIG. 6, the layers D and E are offset from each other by half a cell diagonal length 88. Using this offset, adjacent layers D, E contact and connect to each other only at crossing areas 83 on each side wall of each cell. These crossing areas 83 may be enlarged relative to a thickness of the cell side wall as shown.

This vertical and/or diagonal offset allows air to flow both vertically and horizontally between the overlapping voids of the cells 82. Three exemplary flow paths 38-38A, 38-38B, and 38-38C are shown. An air flow 38 enters through inlets in the layer in front of layer E, not shown. An exemplary inlet 29 in layer D and an outlet 31 in layer E are shown. If pass-through holes 86 are provided, air can flow between the layers D, E for additional routing 38C as shown. If the layers D, E are offset vertically instead of diagonally, and they do not have pass-through holes 86, air can only flow vertically in a serpentine path between alternating layers.

This invention provides superior cooling effectiveness and lower cooling flow requirement. It provides serpentine cooling passages and is suitable for load-bearing elements. A characteristic of the invention is a repeating pattern of interconnected voids and interconnected solids that is determinate, not random, thus forming a structure that can be fully engineered to predictably handle cyclic thermal and mechanical loads. "Determinate" does not mean that the pattern of voids and solids cannot vary along a wall. It means that the dimensions and locations of the solid and voids forming the serpentine paths in the wall are specified and known. For this reason, the geometry and distribution of the solid and the porosity may be fully engineered. Methods herein describe fabrication of airfoils and other components with structural walls having determinate and complex coolant passages. Porosity can be varied from the cold side to the hot side to effectively distribute cooling air through the structure.

This structure offers strength and predictability to carry mechanical and thermal loads for specific applications, such as in component walls in the hot gas flow path of gas turbines. For example, the layers described herein may form sequential cross sections of a gas turbine airfoil, which may be built-up from one end to the other by lamination or additive manufacture, or may be cast as described herein to form either a full airfoil or sections that are bonded together to form a full airfoil.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A porous structure comprising:
   a wall comprising an interior and an exterior surface;
   a pattern of discretely defined voids in the wall forming a plurality of serpentine passages effective to provide transpiration cooling between the interior and exterior surfaces;
   wherein the serpentine passages are formed by partially overlapping voids in alternating layers of the wall;
   and wherein the layers are non-parallel to a plane of the interior or exterior surface.

2. The porous structure of claim 1, wherein the layers are substantially normal to the plane of the interior or exterior surface.

3. The porous structure of claim 1, wherein some of the voids in at least some of the layers are open to the interior wall surface, forming inlets to the serpentine passages, and others of the voids in at least some of the layers are open to the exterior wall surface, forming outlets of the serpentine passages.

4. The porous structure of claim 3, wherein said some of the voids are not open to the exterior wall surface, and said others of the voids are not open to the interior wall surface, and each serpentine passage goes through at least two of the layers to communicate between the interior and exterior wall surfaces.

5. The porous structure of claim 3, wherein at least some of said others of the voids comprise a constricted outlet at the exterior surface of the wall to meter a coolant fluid passing through the serpentine passages.

6. The porous structure of claim 3, wherein a degree of overlap between at least some overlapping voids is restricted to meter a coolant fluid passing through the serpentine passages.

7. The porous structure of claim 1 formed as a lattice of nodes and links comprising interconnected planes of interconnected unit cells on a scale of 0.1 to 5.0 mm unit cell spacing, wherein the lattice allows particles at least up to 10 microns in diameter to pass through the porous structure.

8. The porous structure of claim 1 formed by layers of waffle structures with open-ended cells.

9. The porous structure of claim 8, wherein adjacent layers are offset by up to half a diagonal spacing of the open-ended cells.

10. The porous structure of claim 9, wherein each open-ended cell has a bottom wall with a pass-through hole.

11. A porous structure comprising:
    a wall comprising layers of voids that are determinate and non-random;
    wherein the voids interconnect between layers to form a plurality of tortuous passages between an interior and an exterior surface of the wall; and
    wherein the layers are non-parallel to a plane of the interior or exterior surface;
    and wherein the tortuous passages are formed by partially overlapping voids in alternating layers of the wall.

12. The porous structure of claim 11 wherein some of the voids in at least some of the layers are open to the interior wall surface, forming inlets to the tortuous passages, and others of the voids in said at least some of the layers or in others of the layers are open to the exterior wall surface, forming outlets of the tortuous passages.

13. The porous structure of claim 3, wherein the alternating layers comprise a first layer and a second layer, wherein voids in the second layer are open to the interior wall surface and the exterior wall surface to form the respective inlets and the outlets, and wherein the voids in the first layer are closed to the interior wall surface and the exterior wall surface.

14. The porous structure of claim 13, wherein the second layer includes a greater number of voids than the first layer.

15. A porous structure comprising:
- a wall comprising layers of voids that are determinate and non-random;
- wherein the voids interconnect between layers to form a plurality of tortuous passages between an interior and an exterior surface of the wall; and
- a thermal insulation material disposed within at least some of the voids at the exterior surface of the wall;
- wherein the layers are non-parallel to a plane of the interior or exterior surface
- wherein said thermal insulation is configured to induce a lateral flow from the at least some of the voids into other of the voids at the exterior surface of the wall.

* * * * *